United States Patent
Zhang

(10) Patent No.: US 10,187,235 B2
(45) Date of Patent: Jan. 22, 2019

(54) LONG RANGE BLUETOOTH LOW ENERGY SYNCHRONIZATION SYSTEM

(71) Applicant: Intel IP Corporation, Santa Clara, CA (US)

(72) Inventor: Yuwei Zhang, Pleasanton, CA (US)

(73) Assignee: Intel IP Corporation, Santa Clara, CA (US)

( * ) Notice: Subject to any disclaimer, the term of this patent is extended or adjusted under 35 U.S.C. 154(b) by 24 days.

(21) Appl. No.: 15/201,053

(22) Filed: Jul. 1, 2016

(65) Prior Publication Data

US 2018/0006854 A1    Jan. 4, 2018

(51) Int. Cl.
| | |
|---|---|
| H04W 56/00 | (2009.01) |
| H04L 27/156 | (2006.01) |
| H04W 4/80 | (2018.01) |
| H04B 1/7156 | (2011.01) |
| H04L 1/00 | (2006.01) |

(52) U.S. Cl.
CPC ....... *H04L 27/1566* (2013.01); *H04B 1/7156* (2013.01); *H04L 1/00* (2013.01); *H04L 27/1563* (2013.01); *H04W 4/80* (2018.02); *H04W 56/00* (2013.01); *H04W 56/0015* (2013.01); *H04W 56/0035* (2013.01)

(58) Field of Classification Search
CPC .... H04B 1/7073; H04J 13/0074; H04J 13/10; H04L 27/2017; H04L 27/233
See application file for complete search history.

(56) References Cited

U.S. PATENT DOCUMENTS

| | | | | |
|---|---|---|---|---|
| 5,077,753 A * | 12/1991 | Grau, Jr. | ................ | H04B 1/707 375/141 |
| 8,223,820 B2 * | 7/2012 | Rouxel | .................. | H04B 1/707 370/441 |
| 8,755,469 B1 * | 6/2014 | Su | ....................... | H04L 27/0012 375/262 |
| 9,106,485 B1 * | 8/2015 | Waheed | ................ | H04L 27/106 |
| (Continued) | | | | |

FOREIGN PATENT DOCUMENTS

| | | | | |
|---|---|---|---|---|
| EP | 1213890 A2 * | 6/2002 | ............. | H04L 27/22 |
| WO | WO 2015189584 A1 * | 12/2015 | ........... | H04B 1/7073 |
| WO | WO 2016057431 A1 * | 4/2016 | ........... | H04L 1/0028 |

*Primary Examiner* — Berhanu Tadese
(74) *Attorney, Agent, or Firm* — Schiff Hardin LLP

(57) ABSTRACT

A synchronizer can include a symbol estimator, an inner-pattern de-mapper, a timing tracker, and a correlator. The symbol estimator can be configured to estimate one or more symbols of a received signal based on a phase signal. The inner-pattern de-mapper can be configured to de-map the one or more symbols to generate an inner-pattern de-mapped symbol estimation. The timing tracker can be configured to accumulate the inner-pattern de-mapped symbol estimation and to determine a peak position based on the accumulated inner-pattern de-mapped symbol estimation. The correlator can be configured to correlate the accumulated inner-pattern de-mapped symbol estimation based on a reference signal. The correlation of the accumulated inner-pattern de-mapped symbol estimation can be independent of a signal over sampling rate (OSR). The synchronizer can be adapted in a long range Bluetooth low energy (BLE) receiver.

20 Claims, 9 Drawing Sheets

(56) References Cited

U.S. PATENT DOCUMENTS

| | | | |
|---|---|---|---|
| 2002/0044612 A1* | 4/2002 | Sipola | H03M 13/2707 375/295 |
| 2003/0043947 A1* | 3/2003 | Zehavi | H04B 1/7156 375/365 |
| 2003/0156603 A1* | 8/2003 | Rakib | H03M 13/256 370/485 |
| 2003/0228005 A1* | 12/2003 | Melick | H04B 1/7172 379/93.01 |
| 2004/0146125 A1* | 7/2004 | Shiung | H04L 7/046 375/334 |
| 2005/0185729 A1* | 8/2005 | Mills | H04B 1/7105 375/267 |
| 2006/0262836 A1* | 11/2006 | Yuan | H04J 3/0608 375/150 |
| 2007/0025475 A1* | 2/2007 | Okunev | G06K 7/0008 375/343 |
| 2007/0064777 A1* | 3/2007 | Gunzelmann | H04B 1/708 375/150 |
| 2008/0089393 A1* | 4/2008 | Opperman | G01S 5/06 375/141 |
| 2008/0225935 A1* | 9/2008 | Reddy | H03H 17/0621 375/229 |
| 2009/0086711 A1* | 4/2009 | Capretta | H04L 7/042 370/350 |
| 2009/0135754 A1* | 5/2009 | Yavuz | H04W 74/04 370/311 |
| 2009/0196163 A1* | 8/2009 | Du | H04L 5/0046 370/204 |
| 2009/0232234 A1* | 9/2009 | Du | H04B 7/2621 375/260 |
| 2009/0252099 A1* | 10/2009 | Black | H04L 25/03343 370/329 |
| 2011/0026578 A1* | 2/2011 | Chen | H04L 25/03159 375/232 |
| 2013/0065584 A1* | 3/2013 | Lyon | H04W 28/06 455/434 |
| 2013/0195229 A1* | 8/2013 | Cheng | H04L 27/0014 375/343 |
| 2014/0093023 A1* | 4/2014 | Park | H04L 7/0016 375/362 |
| 2014/0355517 A1* | 12/2014 | Reunamaki | H04W 8/005 370/328 |
| 2015/0124906 A1* | 5/2015 | Gopalan | H04L 27/12 375/302 |
| 2015/0222419 A1* | 8/2015 | Bachmann | H03L 7/08 375/327 |
| 2015/0249560 A1* | 9/2015 | Waheed | H04W 4/008 375/335 |
| 2015/0327001 A1* | 11/2015 | Kirshenberg | H04W 4/18 455/41.2 |
| 2016/0073220 A1* | 3/2016 | Wang | H04W 4/008 455/41.2 |
| 2016/0105761 A1* | 4/2016 | Polo | H04W 56/001 455/41.2 |
| 2016/0142177 A1* | 5/2016 | Chou | H04L 1/0005 370/329 |
| 2016/0286339 A1* | 9/2016 | Weizman | H04W 4/008 |
| 2016/0373279 A1* | 12/2016 | Lopez | H04L 5/0053 |
| 2016/0381637 A1* | 12/2016 | Kvetny | H04L 67/28 370/311 |
| 2018/0006854 A1* | 1/2018 | Zhang | H04L 27/1566 |
| 2018/0159679 A1* | 6/2018 | de Ruijter | H04L 7/042 |
| 2018/0252796 A1* | 9/2018 | Qu | G01S 5/30 |
| 2018/0262277 A1* | 9/2018 | Koksal | H04B 11/00 |

* cited by examiner

| Preamble 205 | Coded Access Address 210 | RI 215 | PDU 220 | CRC 225 | TERM 230 |

200

LR BLE Packet Format

FIG. 2

LONG RANGE BLUETOOTH LOW ENERGY SYNCHRONIZATION SYSTEM

BACKGROUND

Field

Aspects described herein generally relate to long range Bluetooth Low Energy (BLE) devices, including, long range BLE devices with synchronization and timing tracking.

Related Art

Bluetooth Low Energy (BLE) is a wireless personal area network technology that, when compared with Regular Bluetooth, provides reduced power consumption and cost while maintaining a similar communication range. The long range BLE technology provides an increased connectivity range compared with the BLE technology.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 2 illustrates long range BLE packet format according to an exemplary aspect of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, the present disclosure is directed to a long range Bluetooth Low Energy (BLE) system having a synchronizer configured to generate timing information and provide the timing information to a demodulator that demodulates payload data of a received long range BLE signal. The synchronizer can be configured to capture the access address code from the frequency domain signal and provide accurate timing information to the demodulator to decode the payload data.

Figure 1:
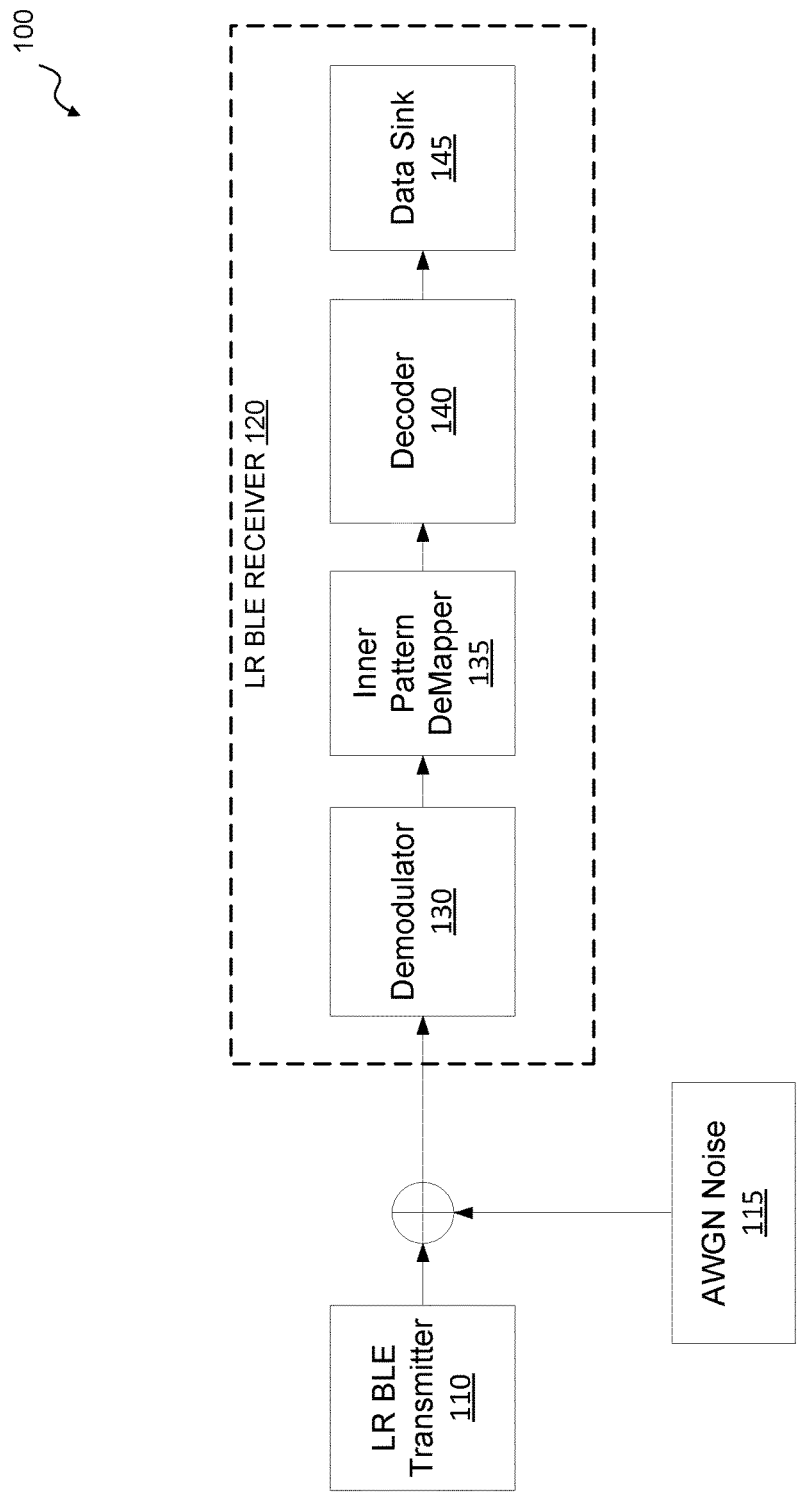
FIG. 1 illustrates a long range Bluetooth Low Energy (BLE) system according to an exemplary aspect of the present disclosure.

FIG. 1 illustrates a long range Bluetooth Low Energy (BLE) system 100 according to an exemplary aspect of the present disclosure. The system 100 includes a long range (LR) Bluetooth Low Energy (BLE) transmitting device 110 and a LR BLE receiving device 120. The LR BLE transmitter 110 is configured to transmit to the LR BLE receiver 120 a LR BLE signal that passes through an Additive White Gaussian Noise (AWGN) channel 115.

In operation, the LR BLR transmitter 110 can be configured to convolutional encode a communication signal to generate an encoded signal. The encoded signal can be inner pattern mapped to generate a mapped signal. The mapped signal can be modulated (e.g., 2-level Gaussian Frequency Shift keying) to generate the LR BLE signal that is transmitted to the LR BLE receiver 120.

The LR BLE receiver 120 includes a demodulator 130, an inner pattern de-mapper 135, a decoder 140 and a data sink 145.

In an exemplary aspect, the demodulator 130 is a 2-level Gaussian Frequency Shift keying (2GFSK) demodulator, but is not limited thereto. The demodulator 130 can be configured to demodulate one or more LR BLE signals received from the LR BLE transmitter 110 via the AWGN channel 115 to generate a demodulated signal. The demodulator 130 can be configured to demodulate the LR BLE signal(s) based on timing information received from a synchronizer (e.g., synchronizer 520 as discussed in detail below). The demodulator 130 can include processor circuitry configured to perform one or more operations and/or functions of the demodulator 130, such as demodulating the LR BLE signal.

The inner pattern de-mapper 135 can be configured to perform one or more de-mapping operations to de-map the demodulated signal to generate a de-mapped signal. In an exemplary aspect, the inner pattern de-mapper 135 de-maps 0011b to bit 1 and 1100b to bit 0. The inner pattern de-mapper 135 can include processor circuitry configured to perform one or more operations and/or functions of the inner pattern de-mapper 135, such as performing one or more de-mapping operations.

The decoder 140 can be configured to perform one or more decoding operations to decode an input signal (e.g., de-mapped signal). In an exemplary aspect, the decoder 140 is a convolutional decoder configured to decode a bit stream based on one or more encoding algorithms. For example, the decoder 140 can be a Viterbi decoder that is configured to use the Viterbi algorithm to decode a bitstream. In this example, the bit stream may have been previously encoded using convolutional code or trellis code. The decoder 140 is not limited to a Viterbi decoder and can be another type decoder as would be understood by one of ordinary skill in the relevant arts. The decoder 140 can include processor circuitry configured to perform one or more operations and/or functions of the decoder 140, such as performing one or more decoding operations.

The data sink 145 can be configured to receive data and store the received data. For example, the data sink 145 can be configured to receive and store binary data. In an exemplary aspect, the data sink 145 can receive the decoded bitstream from the decoder 140 and to store the decoded bitstream and/or data corresponding the decoded bitstream. The data skin can be, for example, a memory, a buffer, or the like. The data sink 145 can include processor circuitry configured to perform one or more operations and/or functions of the data sink 145.

FIG. 2 illustrates long range (LR) BLE packet format 200 according to an exemplary aspect of the present disclosure. The LR BLE packet format 200 includes a preamble 205, a coded access address 210, a rate indicator (RI) 215, a Protocol Data Unit (PDU) 220, a Cyclic Redundancy Check (CRC) 225, and termination (TERM) 230.

The preamble 205 is a fixed sequence of bits. The preamble 205 can include a repeating pattern of bits. For example, the preamble 205 can include 10 repetitions of the bit pattern 00111100b, but is not limited thereto.

The coded access address 210 identifies the BLE connection to which the LR BLE packet 200 belongs. The coded access address 210 can include an identification of a node in the network. In operation, the LR BLE receiver 120 can be synchronized to determine the time at which the coded access address 210 and RI 215 are being received. In an exemplary aspect, the coded access address 210 is 32 bits, but is not limited thereto.

In an exemplary aspect, if the coded access address 210 is 32 bits long and when, for example, subjected to ½ rate convolutional encoding and 1:4 spreading, the coded access address 210 becomes 256 bits (32×2×4 bits).

The RI 215 can indicate the symbol rate of the LR BLE signal. For example, the long range Bluetooth Low Energy (BLE) system 100 can operate in, for example, a 125 k mode, or a 500 k operating mode, but is not limited thereto. The RI 215 can be, for example, a 5-bit long sequence and be 00000b for the 125K mode and 00001b for the 500 k mode. When the RI 215 is subjected to, for example, ½ rate convolutional encoding and 1:4 spreading, the RI 215 becomes 40 bits (5×2×4 bits).

The PDU 220 contains one or more bytes (e.g., N bytes) of user data. The bit size of the PDU 220 depends on the operating mode and is N×8×2×P, where P=4 for 125 k mode and P=1 for 500 k mode. In an exemplary aspect, for either the 125 k or the 500 k operating mode, the PDU 220 is subjected to ½ rate convolutional encoding. When operating in the 500 k mode, the PDU 220 is further subjected to the 1:4 spreading. In the 125 k mode (i.e., P=4), the PDU 220 has a bit length of N×8×2×4 bits. In the 500 k operating mode (i.e., P=1), the PDU 220 has a bit length of N×8×2×1 bits.

The cyclic redundancy check (CRC) 225 is a parity-check bit of CRC code. The CRC 225 is not limited to CRC code and can be another parity-check code as would be understood by those skilled in the art. The CRC 225 can be, for example, 24 bits. When the CRC 225 is subjected to, for example, ½ rate convolutional encoding and 1:4 spreading, the CRC 225 has a total length of 24×2×P, where the value of P depends on the operating mode (P=4 for 125 k mode and P=1 for 500 k mode). The CRC 225 can be used for error detecting.

Termination code (TERM) 230 is a termination of the convolutional code. In an exemplary aspect, the TERM 230 is 3 bits long. When the TERM 230 is subjected to, for example, ½ rate convolutional encoding and 1:4 spreading, the TERM 230 has a total length of 3×2×P, where the value of P depends on the operating mode (P=4 for 125 k mode and P=1 for 500 k mode).

Figure 3:
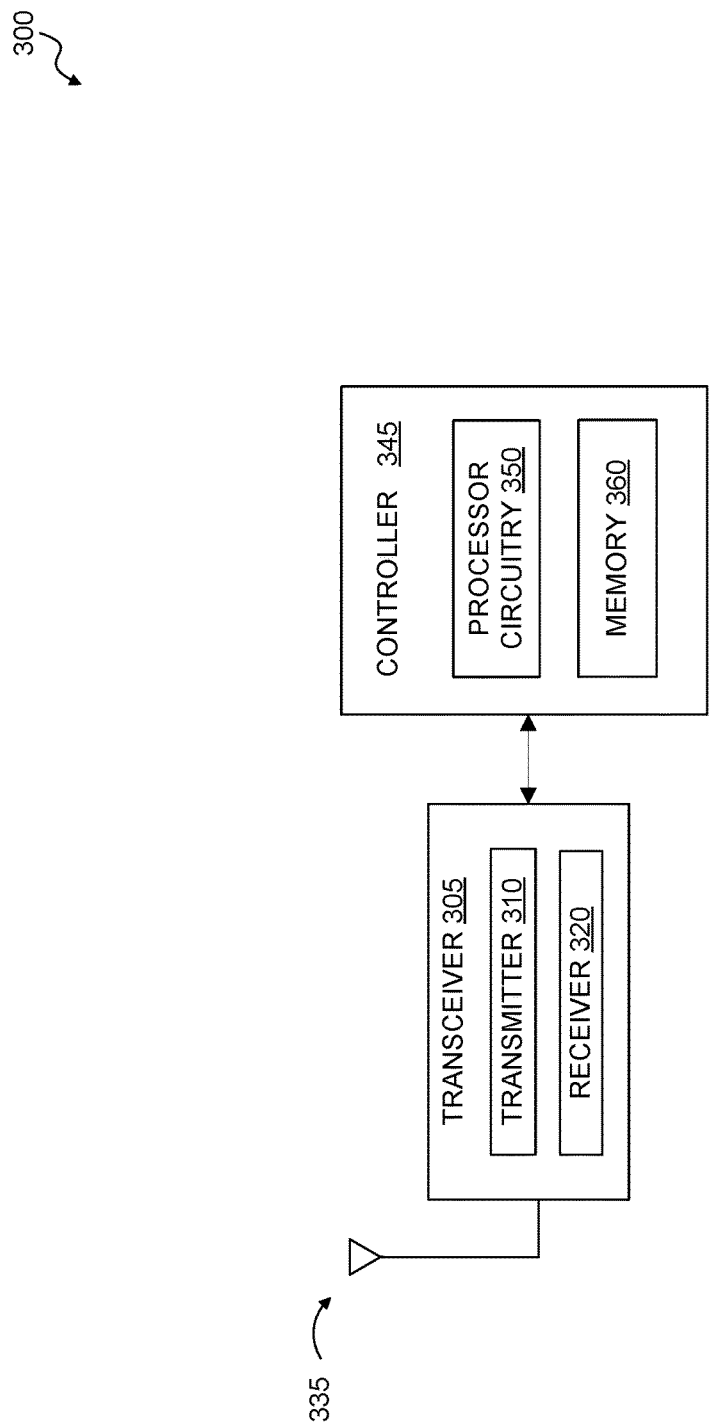
FIG. 3 illustrates a mobile device according to an exemplary aspect of the present disclosure.

FIG. 3 illustrates a mobile device 300 according to an exemplary aspect of the present disclosure. The mobile device 300 is configured to transmit and/or receive wireless communications via one or more wireless technologies. For example, the mobile device 300 can be configured for wireless communications conforming to the LR BLE protocol, but is not limited thereto.

The mobile device 300 can be configured to communicate with one or more other communication devices, including, for example, one or more other mobile devices and/or one or more other wireless communication devices as would be understood by one of ordinary skill in the relevant arts. In one or more aspect, the mobile device 300 can also be configured to communicate with one or more base stations and/or one or more access points.

The mobile device 300 can include a controller 345 communicatively coupled to one or more transceivers 305. The transceiver(s) 305 can be configured to transmit and/or receive wireless communications via one or more wireless technologies. The transceiver 305 can include processor circuitry that is configured for transmitting and/or receiving wireless communications conforming to one or more wireless protocols. For example, the transceiver 305 can include a transmitter 310 and a receiver 320 configured for transmitting and receiving wireless communications, respectively, via one or more antennas 335. In an exemplary aspect, the receiver 320 is an exemplary aspect of the LR BLE 120.

In exemplary aspects, the transceiver 305 can include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals. In aspects having two or more transceivers 305, the two or more transceivers 305 can have their own antenna 335, or can share a common antenna via a duplexer.

The controller 345 can include processor circuitry 350 that is configured to control the overall operation of the mobile device 300, such as the operation of the transceiver(s) 305. The processor circuitry 350 can be configured to control the transmitting and/or receiving of wireless communications via the transceiver(s) 305, and/or perform one or more baseband processing functions (e.g., media access control (MAC), encoding/decoding, modulation/demodulation, data symbol mapping; error correction, etc.). The processor circuitry 350 can be configured to run one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 345 can include one or more elements of a protocol stack such as, a physical (PHY) layer, media access control (MAC), radio link control (RLC), packet data convergence protocol (PDCP), and/or radio resource control (RRC) elements.

The controller 345 can further include a memory 360 that stores data and/or instructions, where when the instructions are executed by the processor circuitry 350, controls the processor circuitry 350 to perform the functions described herein. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

Examples of the mobile device 300 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 300 may be a stationary communication device, including, for example, a stationary computing device—such as a personal computer (PC), a desktop computer, a computerized kiosk, and an automotive/aeronautical/maritime in-dash computer terminal.

Figure 4:
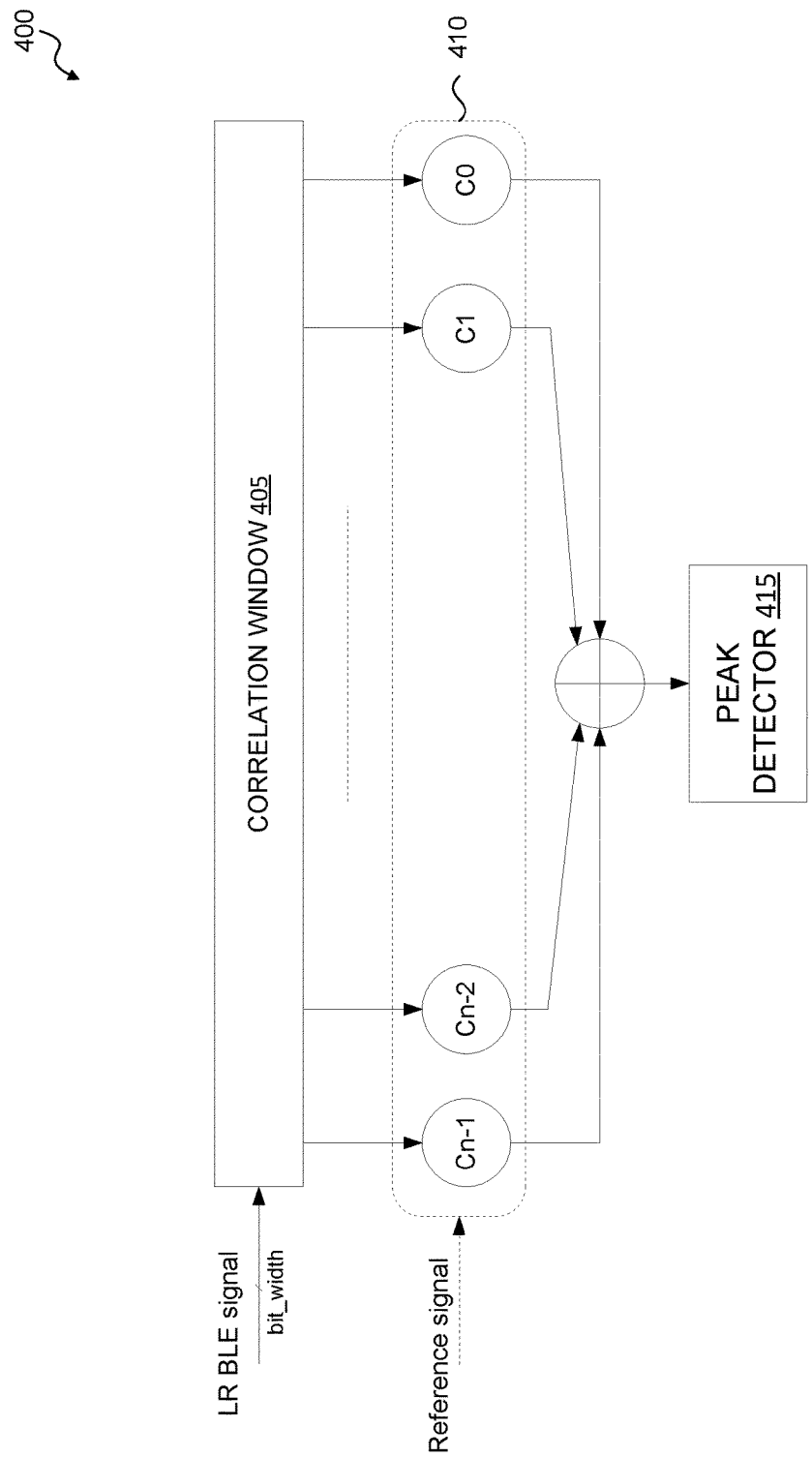
FIG. 4 illustrates a coded access address detection circuit according to an exemplary aspect of the present disclosure.

FIG. 4 illustrates a coded access address detection circuit 400 according to an exemplary aspect of the present disclosure. The coded access address detection circuit 400 includes a correlation window 405, a correlator 410, and a peak detector 415.

The correlation window 405 is configured to receive the LR BLE signal received by, for example, LR BLE receiver 120. In an exemplary aspect, the correlation window 405 is a buffer. The correlation window 405 can include one or more flip-flop registers.

The silicon gate count ($CG_{OSR}$) of the correlation window 405 can be, for example:

$$CG_{OSR} = 4 \times 2 \times 32 \times OSR \times Gates_{FF}$$

where OSR is the signal over sampling rate and $Gates_{FF}$ is the number of gates per flip-flop. The OSR can be, for example 13, but is not limited thereto. The $Gates_{FF}$ value can be, for example, 8, but is not limited thereto. In this example, the correlation window 405 that includes flip-flop registers would include 2×32×OSR×bit_width flip-flop registers, where bit_width is bit resolution of the received LR BLE signal. The bit_width can have a value of, for example, 4, but is not limited thereto. The value of OSR can be set to a large value to achieve very fine timing, which results in a large circuit size for correlation window 405. As described below with reference to FIGS. 6-7B, the synchronizer 520 can be configured to include a synchronization algorithm that is independent of the OSR. In these aspects, the size (e.g., gate count) of the correlation window can be reduced The correlator 410 can be configured to receive a reference signal and to correlate bits of the reference signal with respective bits of the LR BLE signal provided from the correlation window 405.

In an exemplary aspect, the received LR BLE signal is over sampled (e.g., one data symbol has OSR samples). After being subjected to inner code 1:4 spreading and ½ convolutional encoding, the 32-bit coded access address 210 becomes 256 bits (32×2×4 bits). In this example, the width of the correlation window 405 is 4×2×32×OSR samples. As illustrated in FIG. 4, the correlator 410 reconstructs the reference signal based on the 32 bits of the coded access address 210. In this example, the reconstructed reference signal include bits {C0, C1, . . . , Cn−1}, where n=4×2×32×OSR.

The peak detector 415 can be configured to compare a correlation result generated by the correlator 410 to a threshold value. Based on the comparison, the peak detector 415 determines if the access address code has been captured by the coded access address detection circuit 400. The peak detector 415 can include processor circuitry configured to perform one or more operations and/or functions of the peak detector 415.

Figure 5A:
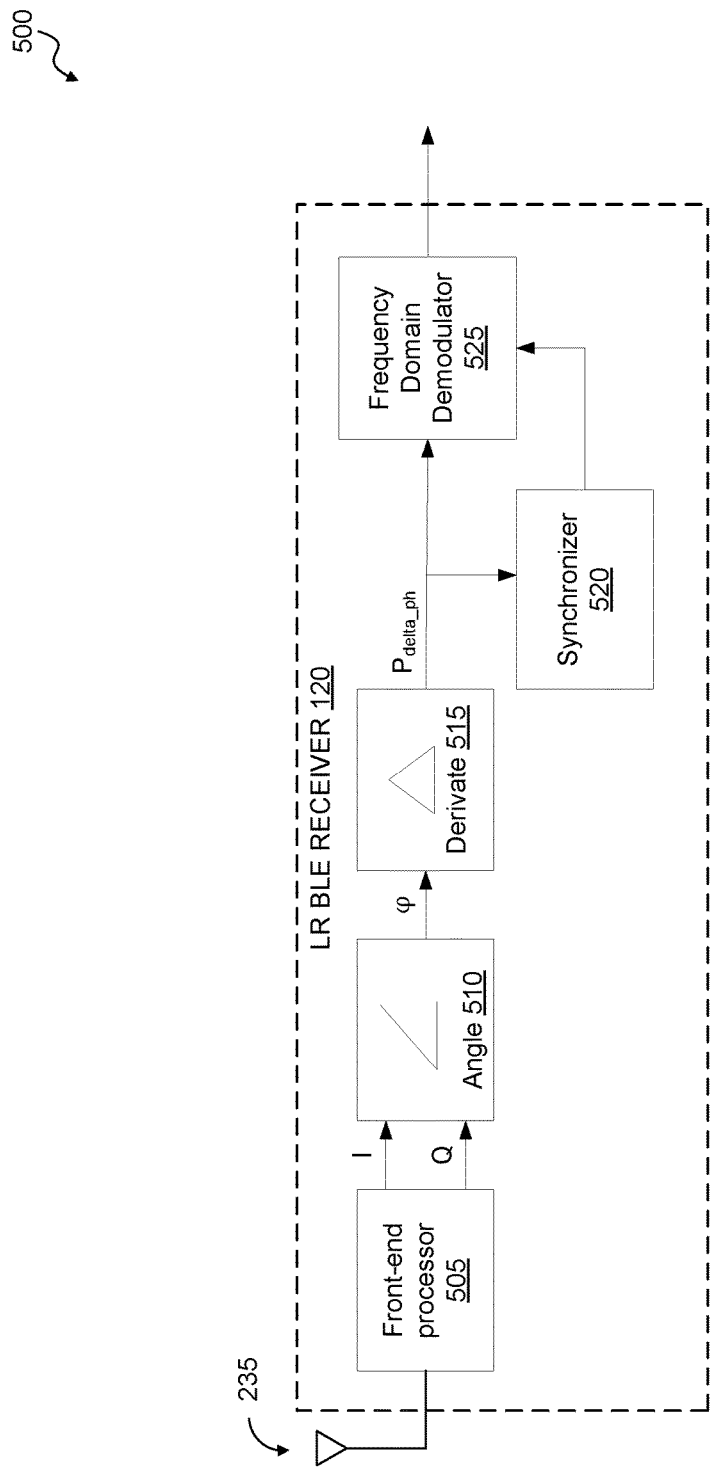
FIG. 5A illustrates a receiver according to an exemplary aspect of the present disclosure.

FIG. 5A illustrates a LR BLE receiver 500 according to an exemplary aspect of the present disclosure. The receiver 500 is an exemplary aspect of LR BLE receiver 120. In an exemplary aspect, the LR BLE receiver 500 is a frequency domain receiver.

The LR BLE receiver 500 includes a front-end processor 505, an angle circuit 510, a derivate circuit 515, a synchronizer 520, and frequency domain demodulator 525.

The front-end processor 520 is configured to receive one or more RF signals via antenna 235 and is configured to generate corresponding baseband in-phase and quadrature (IQ) component signals based on the RF signal(s). The front-end processor 520 can provide the I and Q signals to the angle circuit 510. The front-processor 520 can also perform, for example, one or more channel selection operations, filtering and/or carrier removal. The front-end processor 520 can include processor circuitry configured to perform one or more operations and/or functions of the front-end processor 520.

The angle circuit 510 can be configured to receive one or more I/Q signals from the front-end processor 505 and to generate one or more corresponding phase signals ($\varphi$) based on the received I/Q signal(s). The angle circuit 510 can provide the phase signal(s) to the derivate circuit 515. The angle circuit 510 can include processor circuitry configured to perform one or more operations and/or functions of the angle circuit 510.

The derivate circuit 515 can be configured to receive one or more phase signal(s) from the angle circuit 510 and to calculate one or more differential phase output signals based on the phase signals. In an exemplary aspect, the differential phase output signal is a frequency domain signal satisfies the following equation:

$$P_{delta\_ph} = P_{n-1} - P_n$$

where $P_{delta\_ph}$ is the differential phase output signal, $P_{n-1}$ is the previous phase output signal, and $P_n$ is the current phase output signal. The derivate circuit 515 can provide the $P_{delta\_ph}$ signal to the synchronizer 520 and the frequency domain demodulator 525. The derivate circuit 515 can include processor circuitry configured to perform one or more operations and/or functions of the derivate circuit 515.

The synchronizer 520 can be configured to capture the access address code from the frequency domain signal (i.e., $P_{delta\_ph}$ signal) and to generate timing information based on the access address code. The synchronizer can provide the timing information to frequency domain demodulator 525. In an exemplary aspect, the synchronizer 520 can be configured to perform symbol estimation, inner pattern de-mapping, timing tracking and correlation operations as described in detail with reference to FIGS. 6-7B. The synchronizer 520 can include processor circuitry configured to perform one or more operations and/or functions of the synchronizer 520.

The frequency domain demodulator 525 can be configured to demodulate a received signal to generate a demodulated output signal. The frequency domain demodulator 525 can demodulate the frequency domain signal (i.e., $P_{delta\_ph}$ signal) based on the timing information from the synchronizer 520 to obtain (e.g., decode) corresponding payload data. The frequency domain demodulator 525 can include processor circuitry configured to perform one or more operations and/or functions of the frequency domain demodulator 525.

Figure 5B:
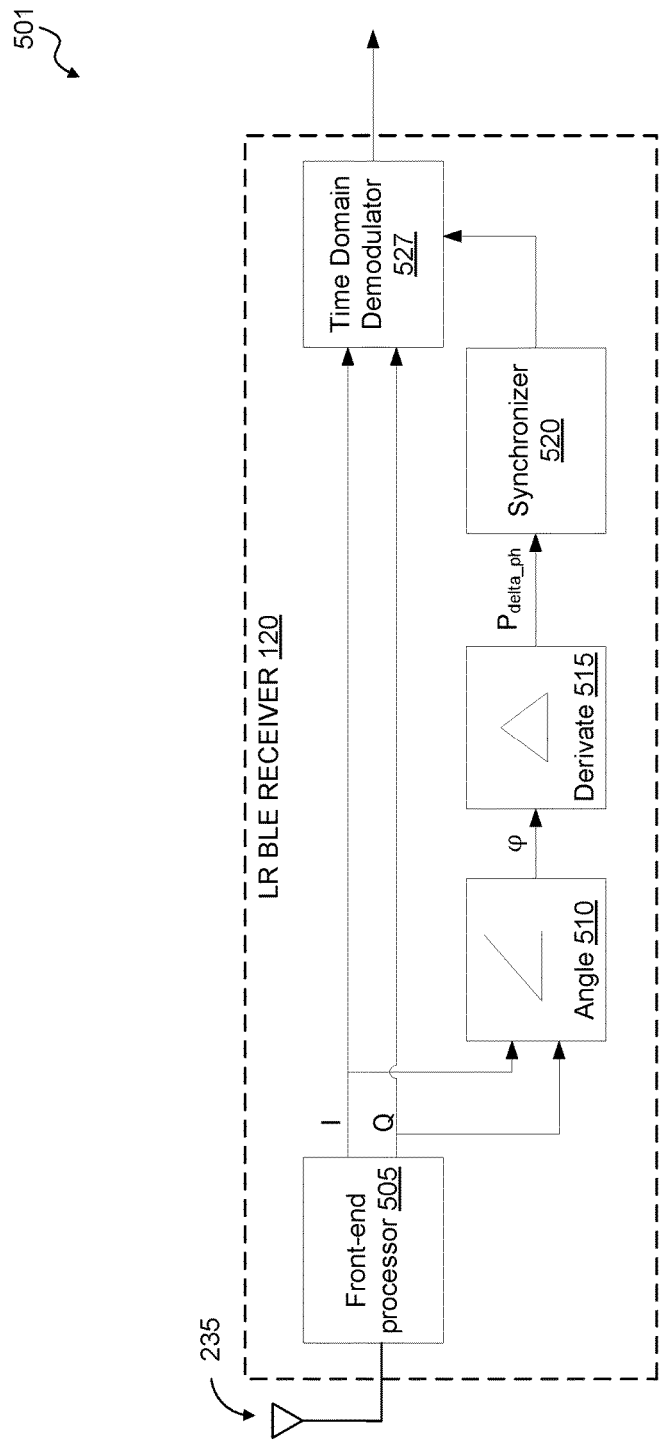
FIG. 5B illustrates a receiver according to an exemplary aspect of the present disclosure.

FIG. 5B illustrates a LR BLE receiver 501 according to an exemplary aspect of the present disclosure. The receiver 501 is an exemplary aspect of LR BLE receiver 120. In an exemplary aspect, the LR BLE receiver 501 is a time domain receiver.

The LR BLE receiver 501 is similar to the LR BLE receiver 500 and also includes the front-end processor 505, angle circuit 510, derivate circuit 515 and synchronizer 520. The LR BLE receiver 501 also includes time domain demodulator 527, which is similar to the frequency domain demodulator 525 but configured for time domain demodulation. Discussion of these similar components may have been omitted for brevity. As illustrated in FIG. 5B, the LR BLE receiver 501 includes similar components as the LR BLE receiver 500, but the components are configured differently. For example, the front-end processor 520 is configured to provide the I and Q signals to the angle circuit 510 and the time domain demodulator 725. The angle circuit 510 generates one or more corresponding phase signals ($\varphi$) based on the received I/Q signal(s) and provides the phase signals ($\varphi$) to the derivate circuit 515. The derivate circuit 515 calculates one or more differential phase output signals based on the phase signals and Pdelta_ph signal to the synchronizer 520.

The synchronizer 520 can be configured to capture the access address code from the frequency domain signal (i.e., $P_{delta\_ph}$ signal) and to generate timing information based on the access address code. The synchronizer can provide the timing information to time domain demodulator 527.

The time domain demodulator 527 can be configured to demodulate a received signal to generate a demodulated output signal. The time domain demodulator 525 can demodulate the received I/Q signal(s) based on the timing information from the synchronizer 520 to obtain (e.g., decode) corresponding payload data. The time domain demodulator 527 can include processor circuitry configured to perform one or more operations and/or functions of the frequency domain demodulator 527.

Figure 6:
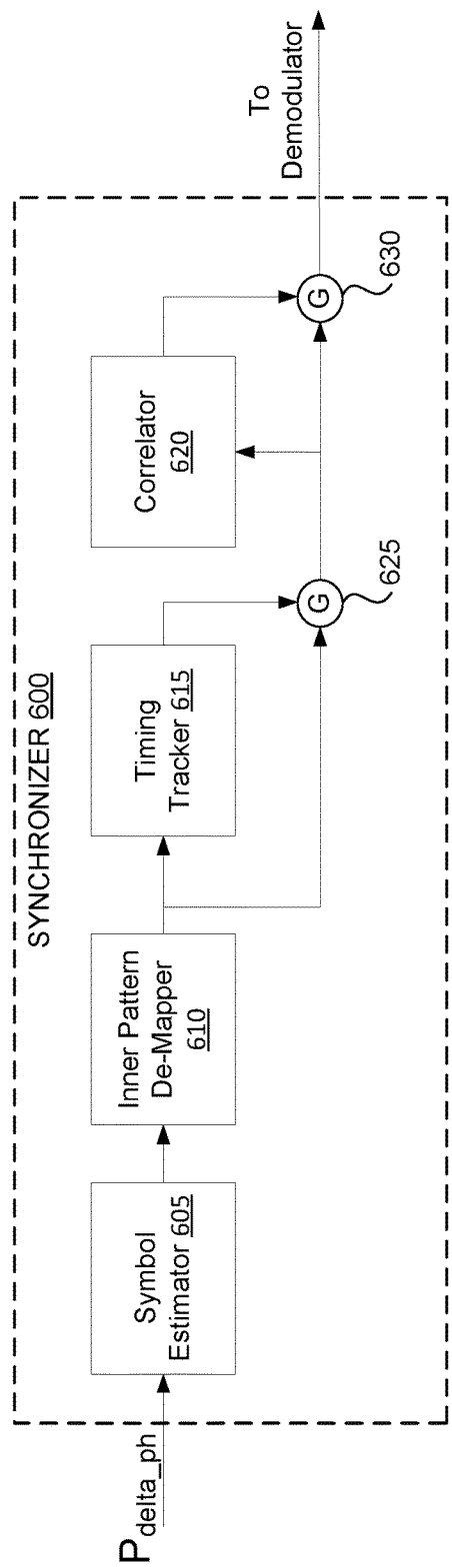
FIG. 6 illustrates a synchronizer according to an exemplary aspect of the present disclosure.

FIG. 6 illustrates a synchronizer 600 according to an exemplary aspect of the present disclosure. The synchronizer 600 is an exemplary aspect of the synchronizer 520, and can include symbol estimator 605, inner pattern de-mapper 610, timing tracker 615, and correlator 620.

The symbol estimator 605 can be configured to perform symbol estimation based on the differential phase output signal $P_{delta\_ph}$ to generate one or more estimated symbols. In an exemplary aspect, the symbol estimator 605 accumulates two or more samples of a corresponding symbol to generate the estimated symbol. The symbol estimator 605 can provide the estimated symbol to the inner pattern de-mapper 610.

The inner pattern de-mapper 610 can be configured to de-map the estimated symbols received from the symbol estimator 605 to generate a corresponding convolutional encoded symbol. The inner pattern de-mapper 610 can generate estimations of the encoded symbol and provide the estimations of the encoded symbol (i.e., inner pattern de-mapped symbol estimation) to the timing tracker 615 and to gate 625.

The timing tracker 615 can be configured to perform one or more time tracking operations based on the inner pattern de-mapped symbol estimation. For example, the time tracker 615 can determine a best estimated encoded symbol of the inner pattern de-mapped symbol estimations received from the inner pattern de-mapper 610. In an exemplary aspect, the timing tracker 615 accumulates the inner pattern de-mapped symbol estimations to determine a peak position (e.g., best timing (bT)) of the accumulation. In operation, the gate 625 will turn on in response to receiving the peak position from the timing tracker 615, and will provide the inner pattern de-mapped symbol estimation to the correlator 620 and the gate 630.

The correlator 620 can be configured to receive the inner pattern de-mapped symbol estimation and to correlate the inner pattern de-mapped symbol estimation based on convolutional encoded access address code to generate a correlation value. The correlator 620 can compare the correlation value to a threshold value to determine whether an access address code acquisition has occurred. The comparison result can be provided to gate 630, which can turn on in response to the comparison result to provide the inner pattern de-mapped symbol estimation passed by gate 625 to the demodulator 525/527. In this example, the size of correlation window is independent of the signal over sampling rate (OSR) and therefore reduces the circuit size of the synchronizer 600.

Figure 7A:
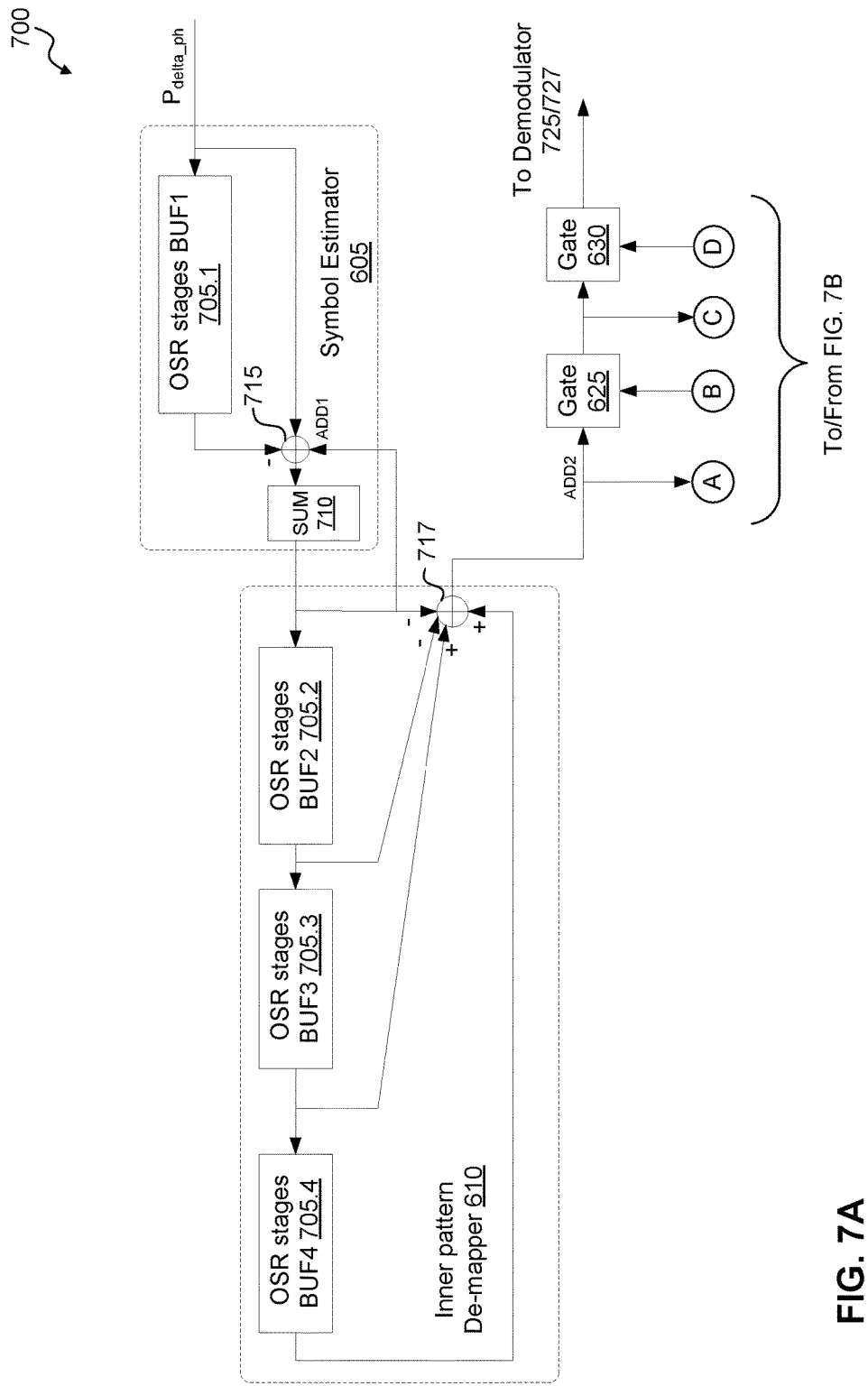
FIGS. 7A-7B illustrate a synchronizer according to an exemplary aspect of the present disclosure.
Figure 7B:
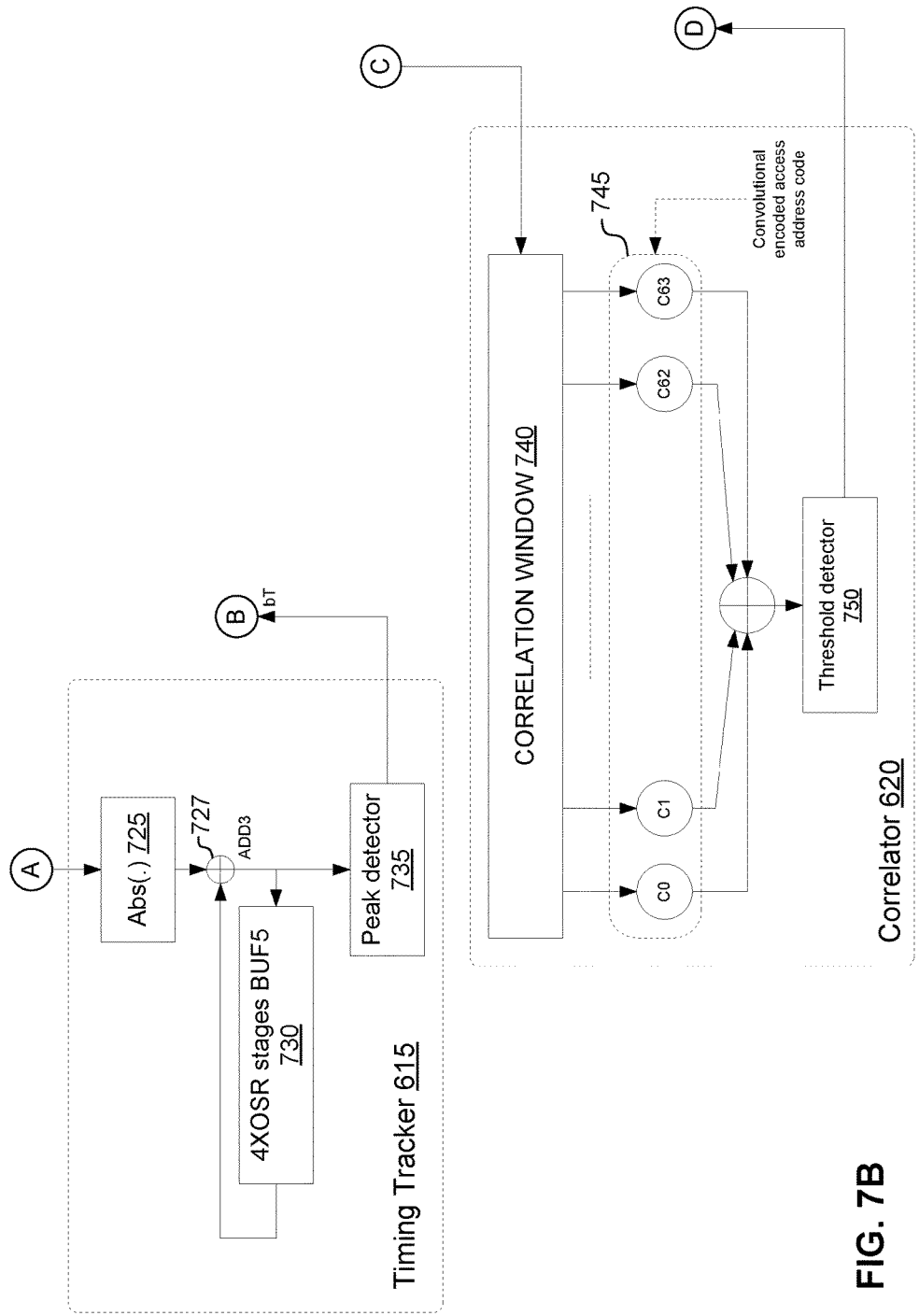

FIGS. 7A-7B illustrate a synchronizer 700 according to an exemplary aspect of the present disclosure. The synchronizer 700 is an exemplary aspect of the synchronizer 600 of FIG. 6. In an exemplary aspect, the synchronizer 700 the symbol estimator 605, inner pattern de-mapper 610, timing tracker 615, and correlator 620.

In an exemplary aspect, the symbol estimator 605 includes a buffer 705.1, summing circuit 710, and mixer 715.

The buffer 705.1 can be configured to receive the differential phase output signal $P_{delta\_ph}$ and to buffer the differential phase output signal $P_{delta\_ph}$. The buffer 705.1 can include one or more flip-flop registers. In this example, the buffer 705.1 is an OSR stage flip-flop register buffer. The buffer 705.1 can be configured to accumulate consecutive OSR values of the differential phase output signal $P_{delta\_ph}$. The output of the buffer 705.1 can be provided to the mixer 715.

The mixer 715 can be configured to receive the differential phase output signal $P_{delta\_ph}$, the output of the buffer 705.1 and the output of the summing circuit 710 and generate a mixed output signal based on the differential phase output signal $P_{delta\_ph}$, the output of the buffer 705.1 and the output of the summing circuit 710. The mixed output signal can be provided as an input to the summing circuit 710. In an exemplary aspect, the mixer 715 can be configure to add output of the summing circuit 710 and the differential phase output signal $P_{delta\_ph}$ and subtract the output of the buffer 705.1 to generate the mixed output signal. In an exemplary aspect, the output of the buffer 705.1 that is subtracted by the mixer 715 is the $(OSR+1)^{th}$ value of the differential phase output signal $P_{delta\_ph}$.

The summing circuit 710 can be configured to buffer the mixed output of the mixer 715 to generate the output of the summing circuit 710. The output of the summing circuit 710 is provided to the inner pattern de-mapper 610. In an exemplary aspect, the summing circuit 710 is a one-stage flip-flop register buffer.

In operation, the summing circuit 710 and the mixer collectively operate as an accumulator. The accumulator operates such that:

$$SUM(n) = \sum_{k=0}^{OSR-1} \Delta\varphi(n-k) \quad n = 0, 1, 2 \ldots \ldots$$

where SUM(n) denotes the value stored in summing circuit 710 at time n; Δφ(n) is the differential phase output signal $P_{delta\_ph}$ at time n.

In operation, the summing circuit 710 is configured to buffer the accumulation of consecutive OSR values of the differential phase output signal $P_{delta\_ph}$. In this example, the summing circuit 710 can function as a symbol data estimator for 2GFSK modulation. The consecutive OSR values of the differential phase output signal $P_{delta\_ph}$ output from the summing circuit 710 provides OSR versions estimation of a received symbol with different timing offset. In this example, the timing offset (e.g., the optimal timing offset) can be selected based on a synchronization function of the synchronizer 700.

The inner pattern de-mapper 610 can include buffer 705.2, buffer, 705.3, buffer 705.4, and mixer 717.

The buffers 705.2-705.4 can be arranged in series such that the buffer 705.2 receives the output of the summing circuit 710, the output of the buffer 705.2 is received by the buffer 705.3, and the output of the buffer 705.3 is received by the buffer 705.4. The output of each of the buffers 705.2-705.4 is also provided to the mixer 717.

The buffers 705.2-705.4 can each include one or more flip-flop registers. In an exemplary aspect, each of the buffers 705.2-705.4 are an OSR stage flip-flop register buffer. In this example, buffers 705.2-705.4 can be configured to accumulate consecutive OSR values.

The mixer 717 can be configured to receive the output of the summing circuit 710, the output of the buffer 705.2, the output of the buffer 705.3, and the output of the buffer 705.4. The mixer 717 can generate a mixed output based on the output of the summing circuit 710, the output of the buffer 705.2, the output of the buffer 705.3, and the output of the buffer 705.4. In an exemplary aspect, the mixer 717 is configured to add the output of the buffer 705.3 with the output of the buffer 705.4 while subtracting the output of the buffer 705.2 and the output of the summing circuit 710. The mixed output of the mixer 717 is provided to the timing tracker 615 and gate 625.

In an exemplary aspect, the mixed output of the mixer 717 provides an estimation of inner pattern de-mapped symbols based on chip code "1100." In this example, each received symbol has OSR samples. Four symbols can be de-mapped to form one convolutional encoded symbol. For example, the mixed output of the mixer 717 provides 4×OSR version estimations to a de-mapped symbol. The timing tracker 615 can be configured to select one of the 4×OSR version estimations to be used. In an exemplary aspect, the timing tracker 615 can be configured to select the optimal version.

The timing tracker 615 can include an absolute calculation circuit 725, a mixer 727, a buffer 730, and a peak detector 735.

The absolute calculation circuit 725 can be configured to receive the mixed output of the mixer 717 (e.g., 4×OSR version estimations) from the inner pattern de-mapper 610 and to calculate an absolute value of the received input. The calculated absolute value can be provided to the mixer 727.

The buffer 730 can be configured to receive the mixed output of the mixer 727, and can include one or more flip-flop registers. In an exemplary aspect, the buffer 730 is a 4×OSR stage flip-flop register buffer having 4×OSR registers. In this example, buffer 730 can be configured to accumulate consecutive 4×OSR version estimations to the de-mapped symbol. In an exemplary aspect, the buffer 730 is cleared on initialization of the synchronizer 700. In an exemplary aspect, the buffer 730 includes a normalization scheme to normalize the buffered values.

The mixer 727 can be configured to receive the output of the absolute calculation circuit 725 and the output of the buffer 730. The mixer can generate a mixed output based on the output of the absolute calculation circuit 725 and the output of the buffer 730. In an exemplary aspect, the mixer 727 can be configured to add the output of the absolute calculation circuit 725 with the output of the buffer 730 to generate the mixed output of the mixer 727.

The peak detector 735 can be configured to determine a peak position (e.g., best timing (bT)) of the accumulation of the consecutive 4×OSR version estimations to the de-mapped symbol. In an exemplary aspect, the peak detector 735 will determine the peak position for every 4×OSR inputs. The peak position indication (bT) corresponding to the detected peak position will be provided to gate 625. In operation, the gate 625 will turn on in response to receiving the peak position indication from the timing tracker 615. Therefore, the gate 625 selectively provides a selected inner-pattern de-mapped symbol estimation from the mixed output of the mixer 717 to the correlator 620 and the gate 630 based on the peak position indication (bT) signal from the peak detector 735. For example, the gate 625 is selectively enabled based on peak position indication signal to provide the correlator 620 with an inner-pattern de-mapped symbol estimation determined to have the best timing by the peak detector 735. In an exemplary aspect, the symbol boundary can be determined based on the peak position indication (bT).

The correlator 620 includes a correlation window 740, a correlator 745, and a threshold detector 750. The correlation window 740 is configured to receive the selected output (e.g. selected inner-pattern de-mapped symbol estimation) of the mixer 717 via gate 625. In this example, the selective enabling of the gate 625 provides a selected inner-pattern de-mapped symbol estimation to the correlation window 740. The correlation window 740 is also configured to buffer the received signal. In an exemplary aspect, the correlation window 740 is a buffer. The correlation window 740 can include one or more flip-flop registers. In an exemplary aspect, the size of the correlation window 740 is independent of the OSR. In this example, because the gate 625 selectively limits the input to the correlation window 740 based on the detected peak position, the correlation window 740 selectively receives those inner pattern de-mapped symbol estimations that are associated with the peak position instead of each OSR version estimation generated by the inner pattern de-mapper 610; and therefore, the correlation window size is independent of the signal over sampling rate (OSR).

For example, the correlation window 740 can be a 2×32 stage buffer having a silicon gate count (GC) that satisfies the following equation:

$$GC = 2 \times 32 \times bit\_width \times Gates_{FF}$$

where bit_width is the bit resolution of the received signal and $Gates_{FF}$ is the number of gates per flip-flop. The bit_width can have a value of, for example, 4, but is not limited thereto. The $Gates_{FF}$ value can be, for example, 8, but is not limited thereto.

In this example, assuming the bit_width and the $Gates_{FF}$ are 4 and 8, respectively, the silicon gate count (GC) would have a value of 2048 gates. In comparison, a correlation window that is dependent on the OSR (e.g., correlation window 405) would have a larger gate count of, for example, $2 \times 32 \times 4 \times OSR \times bit\_width \times Gates_{FF}$ due to the inclusion of (i.e. dependence on) the OSR value (e.g., 13). Therefore, by having the correlation window 740 be independent of the OSR (e.g. by removing the OSR relationship/dependence using the selective limiting of inputs to the correlation window 740), the synchronizer 700 can achieve fine timing while having a smaller circuit footprint (e.g. circuit size) due to the reduced correlation window size (gate count) of the correlation window 740.

The correlator 745 can be configured to receive a reference signal (e.g., the convolutional encoded access address code) and the buffered output of the correlation window 740, and to correlate bits of the reference signal with respective bits provided from the correlation window 740. In an exemplary aspect, the reference signal is ½ rate convolutional encoded sequences of 32-bits access address data. The correlator 745 can include processor circuitry configured to perform one or more operations and/or functions of the correlator 745.

In an exemplary aspect, after being subjected to inner code 1:4 spreading and ½ convolutional encoding, the 32-bit coded access address becomes 256 bits (32×2×4 bits). As illustrated in FIG. 7B, the correlator 745 reconstructs the reference signal based on the 32 bits of the coded access address. In this example, the reconstructed reference signal includes bits {C0, C1, . . . , C63}. In an exemplary aspect, the correlation can be based on hard decision and/or soft decision operation.

The threshold detector 750 can be configured to compare a correlation result generated by the correlator 745 to a threshold value. Based on the comparison, the threshold detector 750 determines if the access address code has been captured by the correlator 620. The threshold detector 750 can generate a signal that indicates whether the access address code has been captured and can provide the signal to gate 630. Based on the signal received by the gate 630, the gate 630 can pass the mixed output of the mixer 717 (e.g., OSR version estimations) that was provided by gate 625 to the input of gate 630. The output of the gate 630 can be connected to the demodulator 720. For example, when the correlation value meets a certain threshold, the threshold detector 750 can determine that the access address code acquisition has been completed and can generate the indication single in response to the acquisition. In operation, the gate 630 is turned on in response to receiving the indication signal. Upon the access address code acquisition, the correlation operation can be stopped. The threshold detector 750 can include processor circuitry configured to perform one or more operations and/or functions of the threshold detector 750.

In an exemplary operation, the first five symbols output from gate 630 can be used to for RI decision. If the RI indicates that the 125K mode is being used, the timing tracker 615 can continue operating through the end of the data packet. Otherwise, the timing tracker 615 can stop operation after the RI portion of the data packet.

In an exemplary aspect, synchronizer 700 can provide information about boundary of the over sampled data symbol and the payload data. For example, the symbol boundary is indicated by the peak position indication (bT) and the payload boundary is determined from the timing of access address code being acquired (i.e., the indication signal generated by the threshold detector 750). The synchronizer 700 can provide information about boundary of the over sampled data symbol and the payload data for time-domain and/or frequency-domain demodulation schemes. As a result, the synchronizer can provide increase performance with reduced signal-to-noise ratio (SNR) operation.

EXAMPLES

Example 1 is a synchronizer adapted in a receiver, the synchronizer comprising: a symbol estimator configured to estimate one or more symbols of a received signal based on a phase signal; an inner-pattern de-mapper configured to de-map the one or more symbols to generate an inner-pattern de-mapped symbol estimation; a timing tracker configured to accumulate the inner-pattern de-mapped symbol estimation and to determine a peak position based on the accumulated inner-pattern de-mapped symbol estimation; and a correlator configured to correlate the accumulated inner-pattern de-mapped symbol estimation based on a reference signal.

In Example 2, the subject matter of Example 1, wherein the correlation of the accumulated inner-pattern de-mapped symbol estimation is independent of a signal over sampling rate (OSR).

In Example 3, the subject matter of Example 1, wherein the symbol estimator is configured to: buffer the phase signal to generate a buffered phase signal; and generate an accumulated phase signal based on the buffered phase signal and the phase signal, wherein the symbol estimator is configured to estimate the one or more symbols based on the accumulated phase signal.

In Example 4, the subject matter of Example 1, wherein the phase signal is a differential phase signal determined based on a current phase signal and a previous phase signal.

In Example 5, the subject matter of Example 1, wherein the synchronizer is configured to determine a symbol boundary of the received signal based on the peak position.

In Example 6, the subject matter of Example 1, wherein the correlator is configured to generate an indication signal based on the correlation of the accumulated inner-pattern de-mapped symbol estimation, wherein the indication signal indicates acquisition of an access address code.

In Example 7, the subject matter of Example 6, wherein the synchronizer is configured to generate timing information based on the indication signal and the peak position.

In Example 8, the subject matter of Example 1, wherein the correlator comprises a correlation window having a size that is independent of a signal over sampling rate (OSR).

In Example 9, the subject matter of Example 1, wherein the receiver is a long range Bluetooth low energy (BLE) receiver that is configured to receive one or more long range BLE signals.

Example 10 is a mobile device comprising: a controller; and a receiver connected to the controller and configured to receive a signal via a communication protocol, the receiver being further configured to: estimate one or more symbols of the received signal based on a phase signal; de-map the one or more symbols to generate an inner-pattern de-mapped symbol estimation; accumulate the inner-pattern de-mapped symbol estimation; determine a peak position based on the accumulated inner-pattern de-mapped symbol estimation; and correlate the accumulated inner-pattern de-mapped symbol estimation based on a reference signal.

In Example 11, the subject matter of Example 10, wherein the correlation of the accumulated inner-pattern de-mapped symbol estimation is independent of a signal over sampling rate (OSR).

In Example 12, the subject matter of Example 10, wherein the receiver is further configured to: buffer the phase signal to generate a buffered phase signal; and generate an accumulated phase signal based on the buffered phase signal and the phase signal, estimation of the one or more symbols being based on the accumulated phase signal.

In Example 13, the subject matter of Example 10, wherein the phase signal is a differential phase signal determined based on a current phase signal and a previous phase signal.

In Example 14, the subject matter of Example 10, wherein the receiver is further configured to determine a symbol boundary of the received signal based on the peak position.

In Example 15, the subject matter of Example 10, wherein the receiver is further configured to generate an indication signal based on the correlation of the accumulated inner-pattern de-mapped symbol estimation, wherein the indication signal indicates acquisition of an access address code.

In Example 16, the subject matter of Example 15, wherein the receiver is further configured to generate timing information based on the indication signal and the peak position.

In Example 17, the subject matter of Example 16, wherein the receiver comprises a demodulator configured to demodulate the received signal based on the timing information.

In Example 18, the subject matter of Example 10, wherein the receiver comprises a correlation window having a size that is independent of a signal over sampling rate (OSR), the correlation window being configured to correlate of the accumulated inner-pattern de-mapped symbol estimation.

Example 19 is a long range Bluetooth low energy receiver, comprising: a synchronizer that is configured to: estimate one or more symbols of a received signal based on a phase signal; de-map the one or more symbols to generate an inner-pattern de-mapped symbol estimation; accumulate the inner-pattern de-mapped symbol estimation and to determine a peak position based on the accumulated inner-pattern de-mapped symbol estimation; correlate the accumulated inner-pattern de-mapped symbol estimation based on a reference signal, the correlation of the accumulated inner-pattern de-mapped symbol estimation being independent of a signal over sampling rate (OSR); generate an indication signal based on the correlation of the accumulated inner-pattern de-mapped symbol estimation; and generate timing information based on the indication signal and the peak position; and a demodulator configured to demodulate the received signal based on the timing information.

In Example 20, the subject matter of Example 19, wherein the synchronizer is further configured to determine a symbol boundary of the received signal based on the peak position.

In Example 21, the subject matter of Example 19, wherein the reference signal is a convolutional encoded access address code.

Example 22 is a synchronizer adapted in a receiver, the synchronizer comprising: symbol estimating means for estimating one or more symbols of a received signal based on a phase signal; inner-pattern de-mapping means for de-mapping the one or more symbols to generate an inner-pattern de-mapped symbol estimation; timing tracking means for accumulating the inner-pattern de-mapped symbol estimation and for determining a peak position based on the accumulated inner-pattern de-mapped symbol estimation; and correlating means for correlating the accumulated inner-pattern de-mapped symbol estimation based on a reference signal.

In Example 23, the subject matter of Example 22, wherein the symbol estimating means: buffers the phase signal to generate a buffered phase signal; and generates an accumulated phase signal based on the buffered phase signal and the phase signal, wherein the symbol estimating means estimates the one or more symbols based on the accumulated phase signal.

In Example 24, the subject matter of any of Examples 22-23, wherein the phase signal is a differential phase signal determined based on a current phase signal and a previous phase signal.

In Example 25, the subject matter of any of Examples 22-24, wherein the synchronizer is configured to determine a symbol boundary of the received signal based on the peak position.

In Example 26, the subject matter of any of Examples 22-25, wherein the correlating means generates an indication signal based on the correlation of the accumulated inner-pattern de-mapped symbol estimation, wherein the indication signal indicates acquisition of an access address code.

In Example 27, the subject matter of any of Examples 22-26, wherein the synchronizer is configured to generate timing information based on the indication signal and the peak position.

In Example 28, the subject matter of any of Examples 22-27, wherein the correlation of the accumulated inner-pattern de-mapped symbol estimation is independent of a signal over sampling rate (OSR).

In Example 29, the subject matter of any of Examples 22-28, wherein the receiver is a long range Bluetooth low energy (BLE) receiver that is configured to receive one or more long range BLE signals.

In Example 30, the subject matter of any of Examples 22-27 and 29, wherein the correlating means comprises a correlation window having a size that is independent of a signal over sampling rate (OSR).

Example 31 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to LR BLE and can be applied to other communication standards, including (but not limited to), Bluetooth (e.g, non-LR BLE), Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX) (Institute of Electrical and Electronics Engineers (IEEE) 802.16), one or more IEEE 802.11 protocols, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A synchronizer adapted in a receiver, the synchronizer comprising:

a symbol estimator configured to accumulate values of a phase signal based on an over sampling rate (OSR) to generate one or more estimated symbols of a received signal;

an inner-pattern de-mapper configured to de-map the estimated one or more symbols to accumulate OSR samples of the estimated one or more symbols to generate inner-pattern de-mapped symbol estimations that are related to the OSR;

a timing tracker configured to; accumulate the OSR-related inner-pattern de-mapped symbol estimations; determine a peak position based on the accumulated inner-pattern de-mapped symbol estimations; and select an inner-pattern de-mapped symbol estimation from the OSR-related inner-pattern de-mapped symbol estimations based on the peak position to remove a corresponding OSR relationship from the selected inner-pattern de-mapped symbol estimation; and a correlator configured to correlate the selected inner-pattern de-mapped symbol estimation having had its OSR relationship removed with a reference signal that is a convolutional encoded access address code.

2. The synchronizer of claim 1, wherein the removal of the OSR relationship from the selected inner-pattern de-mapped symbol estimation generates an OSR-free inner-pattern de-mapped symbol estimation, and wherein the correlator is configured to correlate the OSR-free inner-pattern de-mapped symbol estimation with the reference signal.

3. The synchronizer of claim 1, wherein the symbol estimator is configured to generate the one or more estimated symbols
based on the accumulated values of the phase signal and the phase signal.

4. The synchronizer of claim 1, wherein the phase signal is a differential phase signal determined based on a current phase signal and a previous phase signal.

5. The synchronizer of claim 1, wherein the synchronizer is configured to determine a symbol boundary of the received signal based on the peak position.

6. The synchronizer of claim 1, wherein the correlator is configured to generate an indication signal based on the correlation of the
selected inner-pattern de-mapped symbol estimation with the reference signal, wherein the indication signal indicates acquisition of the
convolutional encoded access address code.

7. The synchronizer of claim 6, wherein the synchronizer is configured to generate timing information based on the indication signal and the peak position.

8. The synchronizer of claim 1, wherein the correlator comprises a correlation window having a size that is based on an inner-pattern de-mapped symbol estimation having had its OSR relationship removed.

9. The synchronizer of claim 1, wherein the receiver is a long range Bluetooth low energy (BLE) receiver that is configured to receive one or more long range BLE signals.

10. A mobile device comprising:
a controller; and
a receiver connected to the controller and configured to receive a signal via a communication protocol, the receiver being further configured to:
accumulate values of a phase signal based on an over sampling rate (OSR) to generate one or more estimated symbols of the received signal;
de-map the one or more estimated symbols to accumulate OSR samples of the one or more estimated symbols to generate inner-pattern de-mapped symbol estimations that are related to the OSR;

accumulate the OSR-related inner-pattern de-mapped symbol estimations;

determine a peak position based on the accumulated inner-pattern de-mapped symbol estimations; select an inner-pattern de-mapped symbol estimation from the OSR-related inner-pattern de-mapped symbol estimations based on the peak position to remove a corresponding OSR relationship from the selected inner-pattern de-mapped symbol estimation; and correlate the selected inner-pattern de-mapped symbol estimation having had its OSR relationship removed based on a reference signal that is a convolutional encoded access address code.

11. The mobile device of claim 10, wherein the removal of the OSR relationship from the selected inner-pattern de-mapped symbol estimation generates an OSR-free inner-pattern de-mapped symbol estimation, and wherein the correlation includes a correlation of the OSR-free inner-pattern de-mapped symbol estimation with the reference signal.

12. The mobile device of claim 10, wherein the estimation of the one or more symbols is based on the accumulated values of the phase signal and the phase signal.

13. The mobile device of claim 10, wherein the phase signal is a differential phase signal determined based on a current phase signal and a previous phase signal.

14. The mobile device of claim 10, wherein the receiver is further configured to determine a symbol boundary of the received signal based on the peak position.

15. The mobile device of claim 10, wherein the receiver is further configured to generate an indication signal based on the correlation of the selected inner-pattern de-mapped symbol estimation with the reference signal, wherein the indication signal indicates acquisition of the convolutional encoded access address code.

16. The mobile device of claim 15, wherein the receiver is further configured to generate timing information based on the indication signal and the peak position.

17. The mobile device of claim 16, wherein the receiver comprises a demodulator configured to demodulate the received signal based on the timing information.

18. The mobile device of claim 10, wherein the receiver comprises a correlation window having a size that is based on an inner-pattern de-mapped symbol estimation having had its OSR relationship removed, the correlation window being configured to correlate of the selected inner-pattern de-mapped symbol estimation.

19. A long range Bluetooth low energy receiver, comprising: a synchronizer that is configured to:

accumulate values of a phase signal based on an over sampling rate (OSR) to generate one or more estimated symbols of a received signal;

de-map the one or more estimated symbols to accumulate OSR samples of the one or more estimated symbols to generate inner-pattern de-mapped symbol estimations that are related to the OSR;

accumulate the OSR-related inner-pattern de-mapped symbol estimations and to determine a peak position based on the accumulated inner-pattern de-mapped symbol estimations;

select an inner-pattern de-mapped symbol estimation from the OSR-related inner pattern de-mapped symbol estimations based on the peak position to remove a corresponding OSR relationship from the selected inner-pattern de-mapped symbol estimation;

correlate the selected inner-pattern de-mapped symbol estimation having had its OSR relationship removed based on a reference signal that is a convolutional encoded access address code;

generate an indication signal based on the correlation; and generate timing information based on the indication signal and the peak position; and a demodulator configured to demodulate the received signal based on the timing information.

20. The receiver of claim 19, wherein the synchronizer is further configured to determine a symbol boundary of the received signal based on the peak position.

* * * * *